United States Patent
Belwadi et al.

(10) Patent No.: US 8,521,688 B1
(45) Date of Patent: Aug. 27, 2013

(54) RANKING PROVIDERS FOR ADVERTISING LEADS

(75) Inventors: S. Srikanth Belwadi, Bangalore (IN); Sridhar Sundaram, Bangalore (IN)

(73) Assignee: Google Inc., Mountain View, CA (US)

( * ) Notice: Subject to any disclaimer, the term of this patent is extended or adjusted under 35 U.S.C. 154(b) by 583 days.

(21) Appl. No.: 12/234,380

(22) Filed: Sep. 19, 2008

(51) Int. Cl.
*G06F 7/00* (2006.01)

(52) U.S. Cl.
USPC .............. 707/622; 707/751; 707/767

(58) Field of Classification Search
USPC .......... 707/723, 748, 749, 622; 705/1.1, 705/10, 11, 14.51, 14.52, 14.58, 14.6
See application file for complete search history.

(56) References Cited

U.S. PATENT DOCUMENTS

| | | | |
|---|---|---|---|
| 7,035,699 B1 | | 4/2006 | Anderson et al. |
| 2005/0038688 A1 * | | 2/2005 | Collins et al. ............ 705/9 |
| 2005/0181775 A1 * | | 8/2005 | Rideout et al. ............ 455/414.3 |
| 2008/0288481 A1 * | | 11/2008 | Zeng et al. ............ 707/5 |
| 2009/0070130 A1 * | | 3/2009 | Sundaresan et al. ............ 705/1 |
| 2009/0080635 A1 * | | 3/2009 | Altberg et al. ............ 379/216.01 |
| 2009/0089084 A1 * | | 4/2009 | Schoenberg ............ 705/2 |
| 2009/0204600 A1 * | | 8/2009 | Kalik et al. ............ 707/5 |
| 2009/0285378 A1 * | | 11/2009 | Poola et al. ............ 379/201.11 |

OTHER PUBLICATIONS

U.S. Appl. No. 12/104,858, filed Apr. 17, 2008, Jain, A.

* cited by examiner

*Primary Examiner* — Amy Ng
(74) *Attorney, Agent, or Firm* — Fish & Richardson P.C.

(57) ABSTRACT

Systems and methods for provider ranking. Provider ranking systems can identify relevant providers for requests received from users for a product or service offering, and can rank the providers based upon performance ratings associated with the providers. The provider ranking system can submit the request to providers on behalf of the user based upon the ranking.

33 Claims, 6 Drawing Sheets

RANKING PROVIDERS FOR ADVERTISING LEADS

BACKGROUND

This disclosure is related to information retrieval.

Sellers and service providers often work to generate leads for a company. The popularity of the Internet has led to users searching for sellers and service providers over the Internet. Various websites are available that collect information about a user searching for a product or service. In sales, such user information can be referred to as a lead. Leads can be used by companies providing the product or service to generate sales.

However, users may be reluctant to provide their personal information for fear that the information will be resold to providers without the user's consent. Moreover, the personal information, once in the seller's database, typically remains there until the seller removes the information. Thus, the seller can continue to try to market to the user, even though the user may not want to be contacted any further.

SUMMARY

Systems, methods and computer readable media are provided. One aspect of the subject matter described in this specification can be embodied in a method that includes the actions of identifying a plurality of providers based upon a request received from a user for a product or service offering specified by the request; ranking the plurality of providers based upon performance rating associated with each of the plurality of providers; and providing a lead to the providers based upon ranking the plurality of providers. The lead can include contact information for the user and product or service offering information specified by the request. Other embodiments of this aspect include corresponding methods, apparatuses, and computer program products.

Another aspect of the subject matter described in this specification can be embodied in a method that includes the actions of collecting performance information associated with providers; ranking the providers based upon the collected performance information; and providing leads to the providers based upon the ranking, the leads comprising identification of users originating service or product requests. Other embodiments of this aspect include corresponding methods, apparatuses, and computer program products.

Another aspect of the subject matter described in this specification can be embodied in a method that includes the actions of identifying a plurality of providers based upon a request received from a user for a product or service offering specified by the request; ranking the plurality of providers based upon performance rating associated with each of the plurality of providers; providing a list comprising the providers, the order of the providers on the list corresponding to the rankings associated with the providers; and receiving a selection of one or more providers on the list. Other embodiments of this aspect include corresponding methods, apparatuses, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference numbers and designations in the various drawings indicate like elements.

DETAILED DESCRIPTION

Provider ranking systems can enhance contact between users and providers by ranking the providers based upon performance information. Performance information, for example, can provide a measure of the quality associated with the product/service provider. Users can provide a request/query to a search engine or provider locator. The provider ranking system can identify providers associated with the request based upon the product and/or service and other information, such as location information included in the request. The identified providers can then be ranked based upon, for example past performance associated with the providers (e.g., including response time, customer ratings, and/or peer preferences). A lead can be distributed to providers based upon the ranking.

Figure 1:
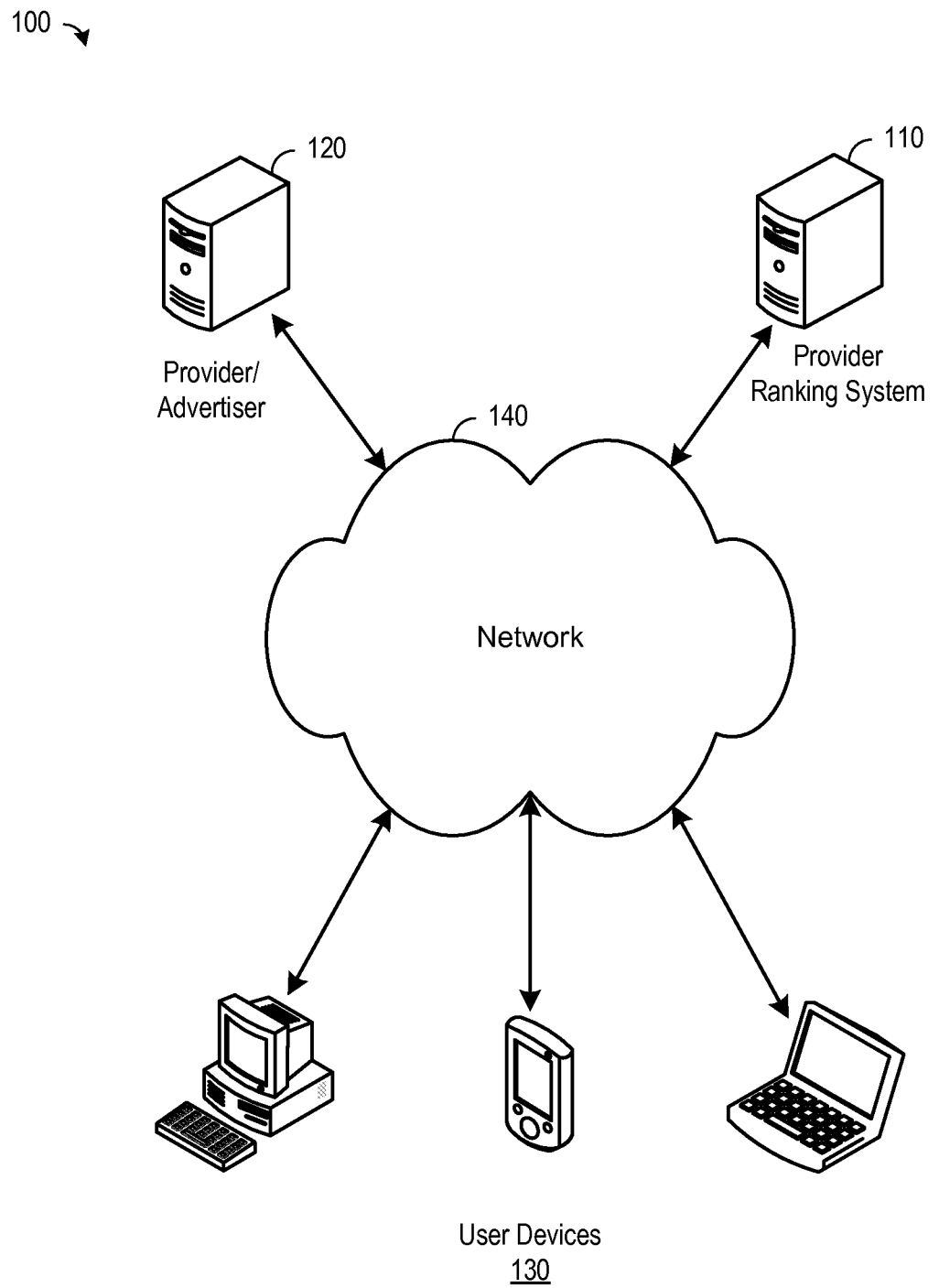
FIG. 1 is a block diagram of an example network architecture for provider ranking

FIG. 1 is a block diagram of an example network architecture 100 including a provider ranking system 110. In some implementations, the provider ranking system 110 can be a server operable to communicate with providers/advertisers 120 (hereinafter collectively referred to as providers, as advertisers are just one specific form of provider of content or services) and user devices 130 through a network 140. The providers 120 can be providers of offerings, such as offerings associated with products or services. The provider ranking system 110 can facilitate communication between the user devices 130 and the providers 120 as well as ranking the providers based upon performance information associated with the providers.

In some implementations, the provider 120 can communicate provider information to the provider ranking system 110. The provider information can include the provider's ability to service various requests (e.g., requests for products or services). For example, when the provider is a mortgage provider, the mortgage provider can identify the types of loans (e.g., small loans, mid-size loans, or large loans) the mortgage provider can source. In other examples, provider information can also include information about a geographical area served by the provider.

In additional implementations, the provider information can include bidding information from the provider. The bidding information can indicate the amount the provider is willing to pay to the provider ranking system 110 to be listed as a referral. For example, where the provider 120 is a mortgage broker, the provider 120 may be willing to pay a certain amount for referrals of potential customers shopping for loans. Moreover, the provider may be willing to pay more for larger loans than for smaller loans. Thus, the bidding information can be multidimensional based upon the product or service offered because the provider is willing to pay more for a large margin product or service than a small margin product or service.

The provider ranking system 110 can aggregate provider information received from the providers 120. The aggregated information can be used to provide user devices 130 with information about the providers. In some implementations, the provider ranking system 110 can receive requests (e.g., queries) from users with regard to a specific product or service. The request can be compared to the provider information to identify which of the providers 120 is qualified to handle the request. Moreover, the provider ranking system 110 can analyze the provider information to determine relevance of the providers 120 to the request, for example, based upon a relevance score for provider information to a request. For example, providers associated with provider information indicating that the provider is a contractor would not be relevant to a request for insurance sales, and would not be identified in response to the request. In some implementations, providers can be assigned a relevance score based upon how well the provider matches the criteria extracted from the request.

In some implementations, the provider ranking system 110 can rank the providers based upon performance information (e.g., quality) associated with the providers. The performance information can include, among others, response time of the provider, customer satisfaction ratings, or peer preferences, and combinations thereof. The response time, for example, can be measured based upon providing a contact address for the user which is routed through the provider ranking system 110. Thus, the provider ranking system 110 can measure the time beginning when the system 110 forwards the user information and/or request to the provider and ending at the time when the provider ranking system 110 receives communications from the provider 120 destined for the user. In some implementations, the response time can be aggregated into an average response time between sending a lead to the provider 120 and the time at which the provider 120 attempts to contact the user. In some examples, the average time can be a rolling average measuring the average response time for a predetermined number of previous leads. In some implementations, faster response times can generally indicate that the provider is paying better attention to the lead.

The customer satisfaction ratings can include the product and/or service ratings received from other users that have communicated with and/or purchased from the provider. In some implementations, the customer satisfaction ratings can be collected from users based upon survey information collected from the user. The survey information can be collected, for example, through an online survey (e.g., "rate this provider") or through offline surveys (e.g., market evaluation surveys) distributed to users of the product or service, or past users of the particular provider. Such surveys can be provided to the users after they have completed a transaction with a provider or have decided not to pursue with a provider.

The peer preferences can include preferences of other users who are associated with the user. In some implementations, the peers can be associated with the user submitting the request by a social graph. An example social graph can be a list of friends from a social networking site. The people that the user has identified as friends can be identified as peers to the user.

In some implementations, the peers can be identified based upon similarity between profiles associated with the users. In some examples, users can be profiled based upon obtaining their permission to participate in profiling or a profile can be obtained from the user when collecting information about the product or service in which the user is interested. In other examples, user profiles can be obfuscated to remove identifying information, thereby protecting user privacy. If a friend or peer to the user has rated a provider highly, the provider ranking system 110 can deduce that the current user would also rate the provider highly based on the inference that users identified as "friends" or "peers" have similar interests and/or preferences.

In some implementations, the provider ranking system 110 can provide a lead to the providers 120 based upon relevance of the provider 120 to the request and based upon performance information associated with the providers 120. The lead can be provided to the provider with contact information for the user. The contact information can provide an address associated with the provider ranking system 110. Upon receiving a communication intended for the requesting user device 130, the provider ranking system can resolve the address and route the communication to the requesting user device 130.

In some implementations, the provider ranking system 110 can present providers 120 to the user device 130. The user can select from among the providers 120 to identify the providers 120 to which the user would like to forward his/her contact information. In some implementations, the providers 120 can be presented to the user device 130 in a ranked order. The ranking can be based upon performance information associated with each of the providers 120. The order of the providers can indicate which of the providers 120 will receive the most leads.

In some implementations, the provider ranking system 110 can provide obfuscated contact information to the providers 120 upon receiving approval from the user. The obfuscated contact information can facilitate user privacy by limiting the provider 120 to communications with the user device 130 through the provider ranking system 110. For example, the obfuscated contact information can include a randomly generated electronic mail (e-mail) address directed to a domain associated with the provider ranking system 110. Thus, any messages addressed to the randomly generated e-mail address will be received by an electronic mail server associated with the provider ranking system 110. The electronic mail server can determine that the address is associated with a user and can resolve the randomly generated e-mail address to send the message to the user device 130 using his/her contact information previously provided. In other examples, the obfuscated contact information can include an extension. In such examples, the provider can call a private branch exchange (PBX) associated with the provider ranking system 110 and enter the extension. The PBX can resolve the extension to a telephone number based upon identifying the user and associated contact information. The PBX can attempt to establish a connection to the telephone number.

In some instances, outgoing messages left on voice mail systems can inadvertently provide identifying information associated with the user. Thus, in some implementations, the PBX can detect when a voice mail system has responded to the connection request. In such instances, the PBX can automatically drop the call (i.e., cutting off the voice mail system). In some implementations, the connection to the voice mail system can be dropped prior to connecting the provider to the call. Thus, the provider would not overhear any of the outgoing message from the voice mail system. In some implementations, the PBX can then record a message from the provider for presentation to the user device 130. In various examples, the recorded message can then be presented (e.g., forwarded) to the user as an attachment to an electronic message or over the telephone (e.g., the voicemail can be forwarded to the user's system, or can be replayed over the telephone to the user) without the presence of the provider.

Figure 2:
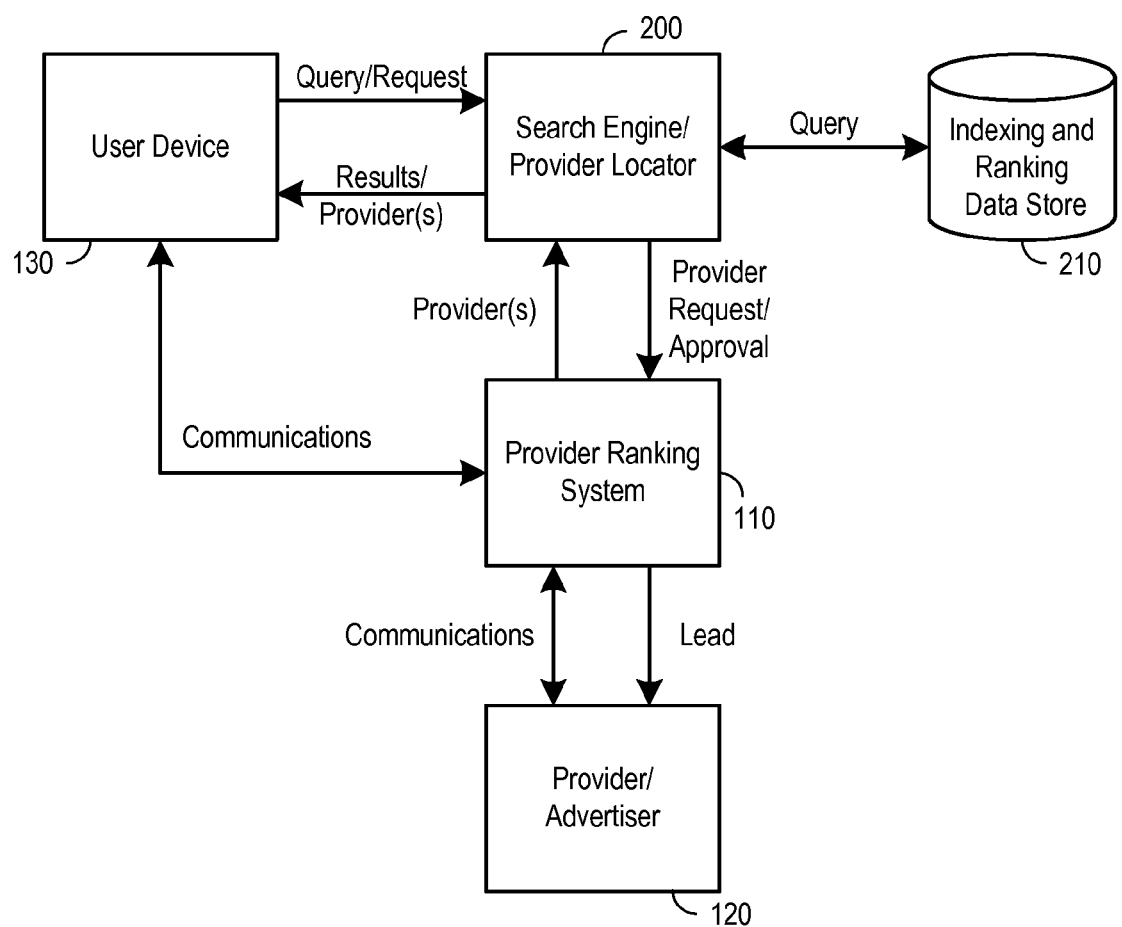
FIG. 2 is a block diagram of an example provider ranking system receiving leads through a search engine.

FIG. 2 is a block diagram of an example provider ranking system 110 receiving leads through a search engine/provider locator 200. A user device 130 can communicate with a search engine/provider locator 200 in an attempt to locate a provider 120. For example, the user can submit a query to the search engine/provider locator 200. In other examples, the user can submit a query to other product or product/service locator engines. The search engine/provider locator 200 can compare the query to an index stored in an index/ranking data store 210 to determine relevance of the various content included in the index 210. The search engine/provider locator 200 can also retrieve ranking information from the index/ranking data store 210 associated with the relevant content to determine the quality of the content. The ranking information and relevance information can be used to determine an order in which to present results associated with the query (e.g., based on an information retrieval (IR) score). In some implementations, bidding information can be used to determine the order in which to present the results associated with the query.

In some implementations, the search engine communicates with the provider ranking system 110 based upon keywords included in queries received from the user. For example, if the user enters the keyword mortgage, the search engine can be configured to recognize that the user is searching for information on mortgages, and can obtain information from the provider ranking system 110 for presentation to the user.

In other implementations, rules can be developed that are triggered by combinations of words used in a query to determine when the user is searching for a product or service provided by a provider 120. For example, if the user device 130 enters the search query "mortgage crisis news," the search engine/provider locator 200 can determine that the user device 130 is probably not searching for mortgage brokers, whereas if the user device 130 enters the search query "mortgage San Jose", the user device 130 is likely searching for a mortgage provider in or around San Jose. In further implementations, the search engine/provider locator 200 can analyze query logs to derive rules for when a user device 130 is likely to be searching for a provider 120 versus when a user device 130 is more likely to be searching for generic news or information. In other implementations, the search engine/provider locator 200 can analyze the results from a search query and analyze the results for similarities to providers 120 to identify when it would be appropriate to communicate with the provider ranking system 110 to locate providers 120 to present to the user as part of the search results.

In some implementations, the provider ranking system 110 can provide a user interface to the user device 130 through the search engine/provider locator 200. The user interface can be provided by a user interface module located within the provider ranking system 110. The search engine/provider locator 200 can receive the user interface from the provider ranking system 110 and can include the user interface within the search results provided to the user.

In some implementations, provider ranking system 110 can use the user interface to collect information from the user device 130. The information can include, for example, contact information associated with the user device 130, as well as service information. For example, contact information can include the user's name, a telephone number, and/or an e-mail address or postal address. The service information can include information about the offering (e.g., a product or service) about which the user device 130 is requesting information. For example, the user device 130 might be requesting information about large screen televisions. The service information can include the types of technology the user is interested (e.g., plasma, digital light processing (DLP), LCD, etc.), as well as size information and/or price information. In various examples, the user interface can allow the user device 130 to select multiple technologies, sizes, and or price ranges.

In some implementations, the information collected from the user can include profile information used to match the user device 130 to a group of peers. Profile information can identify the importance of various provider 120 characteristics for the user device 130. For example, the interface might ask the user to rate the importance of cleanliness for a plumbing service provider on a scale from 1 to 10, 10 being most concerned with cleanliness of a service provider and 1 being not concerned with cleanliness at all.

In some implementations the characteristics can be based upon the particular service being requested. For example, user devices 130 requesting mortgage providers would probably not be concerned with cleanliness of the mortgage provider, but more interested in responsiveness, professionalism, adherence to agreed upon closing schedule, etc. In other implementations, the profile can be developed based upon asking the user device 130 to provide the most important characteristics of product/service providers 130 and matching the user device 130 to other user devices 130 (e.g., a peer group) based upon how closely the characteristics provided by the user device 130 match previously provided characteristics.

In some implementations, the collected information can be received by the search engine/provider locator 200 and provided to the provider ranking system 110. In other implementations, the collected information can be sent directly from the user computer to the provider ranking system 110, thereby ensuring the privacy of the user device 130 by avoiding sharing the collected information with the search engine/provider locator 200. For example, a button representation included in the results page provided to the user device 130 can send the collected information to the search engine/provider locator 200 to be parsed and provided to the provider ranking system 110, or can send the collected information directly to the provider ranking system 110 without inclusion of the search engine/provider locator 200. In other implementations, the provider ranking system 110 can be included within a search engine/provider locator 200.

The provider ranking system 110 can use the collected information to identify a plurality of providers 120 for presentation to the user device 130. Relevant providers can be identified based upon a relevance score for the provider to the request. In some implementations, relevant providers include those providers that exceed a threshold relevance score for the request. For example, relevance scores for providers can be identified based upon the provider offering particular product/service being requested and a proximity of the product/service provider to a specified location (e.g., user location).

After identifying relevant providers, performance information for the relevant providers can be retrieved. In various implementations, performance information can include any of: response time of the provider, customer satisfaction ratings, or peer preferences. In some implementations, the provider ranking system 110 can rank all of the providers 120 meeting a threshold relevance based upon the performance information associated with the providers independently of the relevance score associated with the provider. In such implementations, if a provider meets a threshold relevance, it can be inferred that the provider can serve the request, and that the performance information is the primary criteria defining an order in which the providers 120 are provided to the user device 130. For example, if a first mortgage provider for Green Bay, Wis. is identified and a second mortgage provider for DePere, Wis. is identified and both fall into a geographic location associated with the request, the defining characteristic between the first mortgage provider and second mortgage provider might be performance information associated with the providers. In such implementations, the provider with a better performance record can be ranked above the other provider(s).

In other implementations, the various performance information for a provider 120 can be used as a quality score to modify the relevance score associated with the provider 120. For example, if performance information indicates that a first provider having a highest relevance score is non-responsive and gets poor customer satisfaction ratings, while a second provider having a second highest relevance score is very responsive and gets good customer satisfaction ratings from customers, the provider ranking system 110 can provide the second provider in a favored position to the first provider.

In some implementations, a list of providers 120 can be provided to the user device 130. The list of providers can include a predetermined number of providers in an order defined by the provider ranking system 110. In some implementations, the order can be defined by ranking scores associated with the providers 120 derived by the provider ranking system 110. The rankings can be based on performance information associated with the providers or on a combination of the performance information and relevance scores associated with the providers. In some implementations, the order of ranking in each of multiple categories along with the importance (e.g., a weighting) of the categories can be used to derive an aggregate ranking. For example, five relevant providers might be identified and ranked as described below in Table 1:

TABLE 1

|                | Response Time (20%) | Customer Satisfaction Rating (35%) | Peer Rating (45%) | Average | Weighted Average |
|----------------|---------------------|------------------------------------|-------------------|---------|------------------|
| First Provider  | 1 | 5 | 3 | 3    | 3.3  |
| Second Provider | 4 | 2 | 5 | 3.67 | 3.75 |
| Third Provider  | 2 | 4 | 1 | 2.33 | 2.25 |
| Fourth Provider | 5 | 1 | 2 | 2.67 | 2.25 |
| Fifth Provider  | 3 | 3 | 4 | 3.33 | 3.45 |

In one example, the average rank can be used to provide the order to the listings. As such, the third provider can be listed first, the fourth provider can be listed second, the first provider can be listed third, the fifth provider can be listed fourth and the second provider can be listed last. In examples using the average rank as a ranking methodology, all of the rankings are treated as equal in weight, however, weighting can be applied to each of the individual ranking categories based upon a relative importance or influence of the category. For example, if the categories were weighted 20% to response time, 35% to customer satisfaction, and 45% to peer rating. In the weighted example, the third and fourth providers have an identical weighted average and can be provided first and second, the first provider can be provided third, the fifth provider can be provide fourth and the second provider can be provided last. In those instances where two providers have identical averages or weighted averages, a tiebreaker can be decided, for example, by relevance of the provider to the request. In other examples, the tiebreaker can be decided randomly or can be decided by the rank of the providers in the most heavily weighted category (e.g., the fourth provider is ranked second in the most heavily weighted category while the third provider is ranked first, thus, the third provider is ranked first and the fourth provider ranked second using this tiebreaker). In some implementations, the performance information can be normalized and used to provide a relative ranking based upon a score associated with the normalized performance information.

In some implementations, the performance information can be used to increase or decrease a relevance score associated with the provider, or leave the relevance score unaffected. For example, if a provider's history shows that the provider responds quickly to leads, a relevance score for the provider might be increased by 20%, whereas if the provider's history shows that the provider responds within an average amount of time the relevance score remains the same, or if the provider's history shows that the provider has a below average response time the relevance score can be decreased by 20%. Similarly, if the customer satisfaction ratings associated with the provider are above average, the relevance score can be increased by a predetermined amount or percentage, while below averages ratings might decrease the provider's relevance score by a predetermined amount or percentage. In some implementations, the particular percentage or amount by which a relevance score is increased or decreased can be adjusted by administrators to account for different weightings for each of the categories of performance information. In other implementations, the weightings can be static weightings determined by analysis of the performance of the providers with the leads.

In some implementations, the provider ranking system 110 can also rank the providers 120 based upon an automated auction process. The automated auction process can collect bidding information from providers 120. The provider ranking system 110 can then use the bidding information to rank the providers 120. In some implementations, the bids can be ranked and used as an additional category to Table 1.

In some implementations, the user device 130 can select from among the providers provided to the user device 130. Selection of one or more providers 120 can provide approval or permission to forward the information collected from the user device 130 to the selected one or more providers 120. The information forwarded to the provider 120 can be referred to as a lead.

In some implementations, an operator of the provider ranking system 110 can be compensated by the provider 120 based upon a number of leads provided to the provider 110. In other implementations, the operator of the system 110 can be compensated by the provider 120 based upon the number of exposures (e.g., the number of times a user device 130 is provided the opportunity to select the provider) to user devices 130. In additional implementations, the compensation provided to the operator of the provider ranking system 110 can be based upon a bid (e.g., using an automated auction system) associated with the provider.

Figure 3:
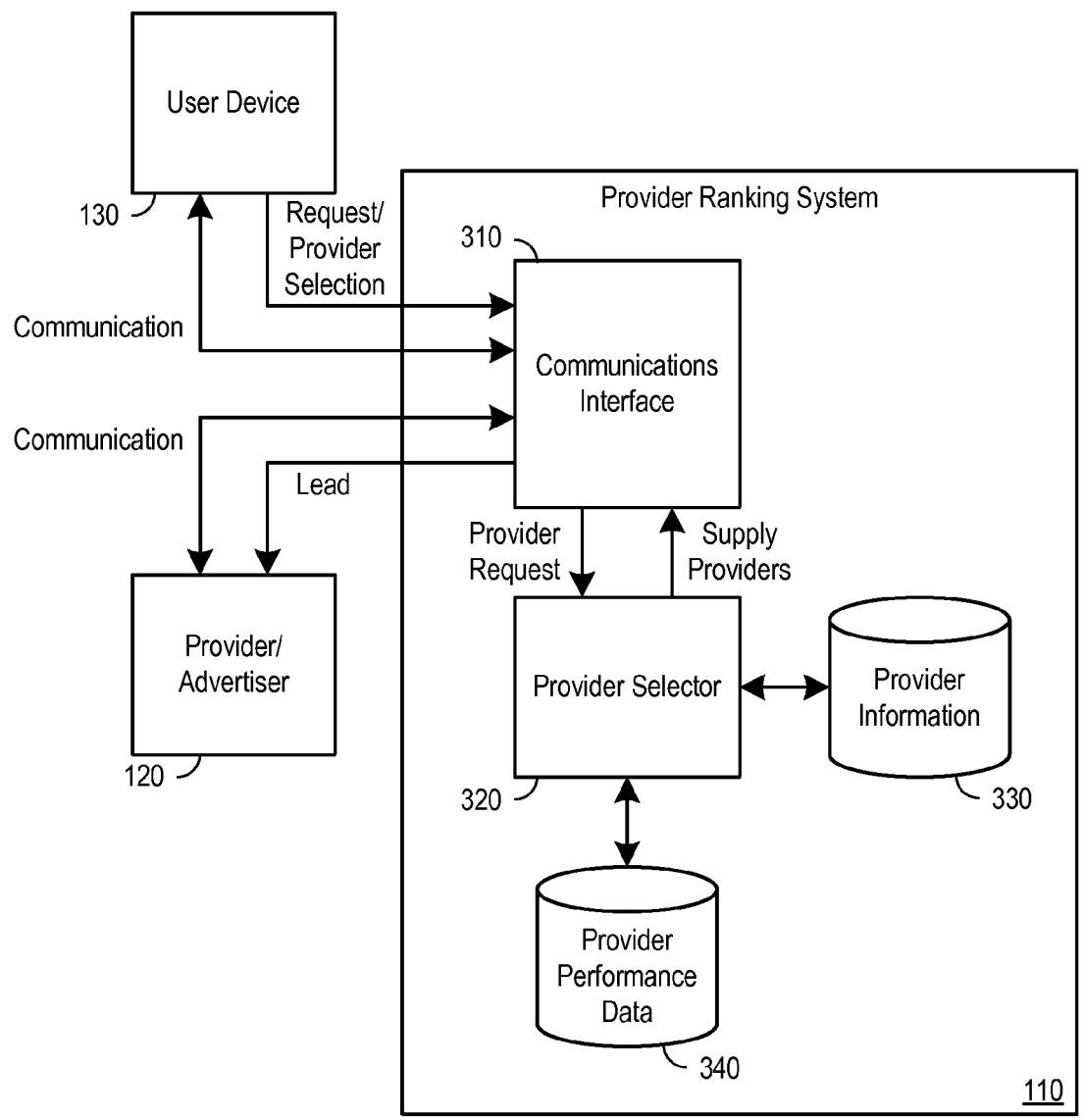
FIG. 3 is a block diagram of an example provider ranking system.

FIG. 3 is a block diagram of an example provider ranking system 110. The provider ranking system 110 can include a communications interface 310, a provider selector 320, a provider information store 330, and a provider performance data store 340. The communications interface 310 can receive requests from user devices 130. In some implementations, the communications interface 310 can parse the request to identify service information associated with the request. In additional implementations, the communications interface 310 can parse the request to identify profile information included in the request. In other implementations, the communications interface 310 can merely pass the request through to the provider selector 320.

The provider selector 320 can operate to identify relevant providers associated with the request. In those implementations where the communications interface 310 parses the request, the provider selector 320 can use the parsed service information to query a provider information data store 330 to identify relevant providers. The provider information store 330 can include keyword information about the products/services provided by the provider 120. In those implementations where the communications interface 310 does not parse the request, the provider selector 320 can receive and parse the request to identify service information and can query the provider information data store 330 to identify relevant providers.

After identifying relevant providers, the provider selector 320 can rank the relevant providers, for example, based on performance (e.g., quality) of the provider. The provider selector 320 can retrieve performance information associated with the relevant providers from a provider performance data store 340. The provider performance data store 340 can include information about the performance of a provider, including, for example, response time, customer satisfaction ratings, and peer ratings.

In some implementations, the provider selector 320 can normalize the performance data and use the normalized performance data to identify rankings for the relevant providers. In some implementations, the normalized performance data can be combined with the relevance score to generate an IR score for each of the providers.

In some implementations, the rankings can be used to identify an order in which the providers are presented to a user. In such implementations, a list of the providers can be presented to the user device 130 through the communications interface 310 in an order defined by the performance/quality rankings of the providers. The list can allow the user to select one or more providers 120 using the user device 130. For example, if five providers are presented to the user, the user might select three of the providers from whom the user would like to receive additional information (e.g., including through a phone call, electronic message, instant message, or SMS message, among others).

In other implementations, the rankings can be used to determine which of the providers receive a lead associated with the request. In such implementations, the submission of the request can be used to provide permission to forward the service information to product/service providers 120. The communications interface 310 can communicate the service information for the user to a predefined number of the highest ranked providers 120. For example, the user might request that the service information be provided as a lead to a user specified number of providers, and the communications interface 310 will forward the service information to the specified number of top ranked providers 120.

In some implementations, the lead can include contact information requiring communication with the user device 130 to proceed through the provider ranking system 110. In some such implementations, the contact information can be obfuscated to obscure the identity of the user and/or user device 130. In other implementations, the identity of the user is not obscured, but contact with the user proceeds through the provider ranking system 110 such that the provider ranking system 110 can monitor the interactions to identify response time and user satisfaction with the provider (e.g., as might be evidence by a product/service conversion).

In some implementations, as incentive to providers who respond quickly, the provider ranking system 110 can route communications from a provider who is first to respond to the lead, and can prevent other providers from contacting the user until the user has rejected the provider that is first to respond. Such implementations can also avoid inundating the user with contact from multiple providers, which might confuse and/or annoy some users. In other implementations, all communications from providers can be forwarded, until the user has requested to disallow communication from one or more of the providers, at which time communications from disapproved or rejected providers can be blocked while communications with other providers are routed.

Figure 4:
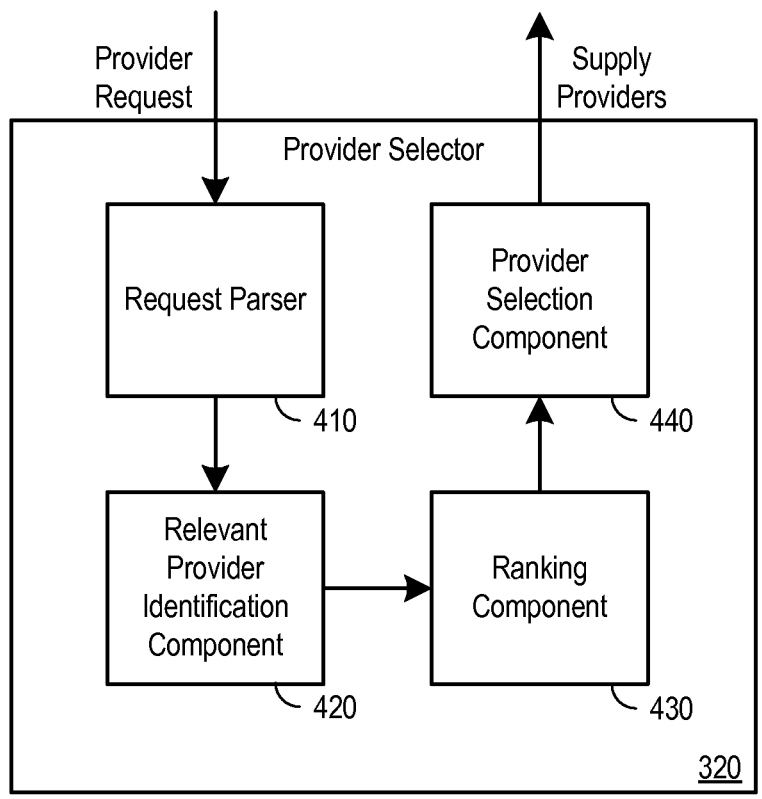
FIG. 4 is a block diagram of an example provider selector.

FIG. 4 is a block diagram illustrating an example provider selector 320. In some implementations, the provider selector can include a request parser 410, a relevant provider identification component 420, a ranking component 430, and a provider selection component 440. The request parser 410 can receive the request and parse the request to identify service information associated with the request. In some implementations, the request parser 410 can also parse the request to identify profile information associated with the requesting user.

The relevant provider identification component 420 can use the service information extracted by the request parser 410 to identify relevant providers to the request. The relevant provider identification component 420 can determine a relevance score of the provider to the request based on, for example, identifying a degree of relation or intersection between keywords associated with the provider and the service information extracted from the request.

The relevant provider identification component 420 can communicate the relevant providers to a ranking component 430. In some implementations, the ranking component 430 can rank the identified providers based upon performance information associated with the providers. The performance information can include, for example, response time, customer satisfaction ratings, and/or peer ratings. In some implementations, the ranking component 430 can normalize the performance information and rank the providers based upon the normalized performance information. In some implementations, the ranking component 430 can weight the categories of performance information based upon system weightings or weighting provided by the user.

The ranking component 430 can communicate the provider rankings to the provider selection component 440. In some implementations, the provider selection component 440 can select a subset of the providers. For example, the provider selection component can select the five or ten highest ranked providers for presentation to the user. In other examples, the provider selection component can select the five or ten highest ranked providers for submission of the lead.

Figure 5:
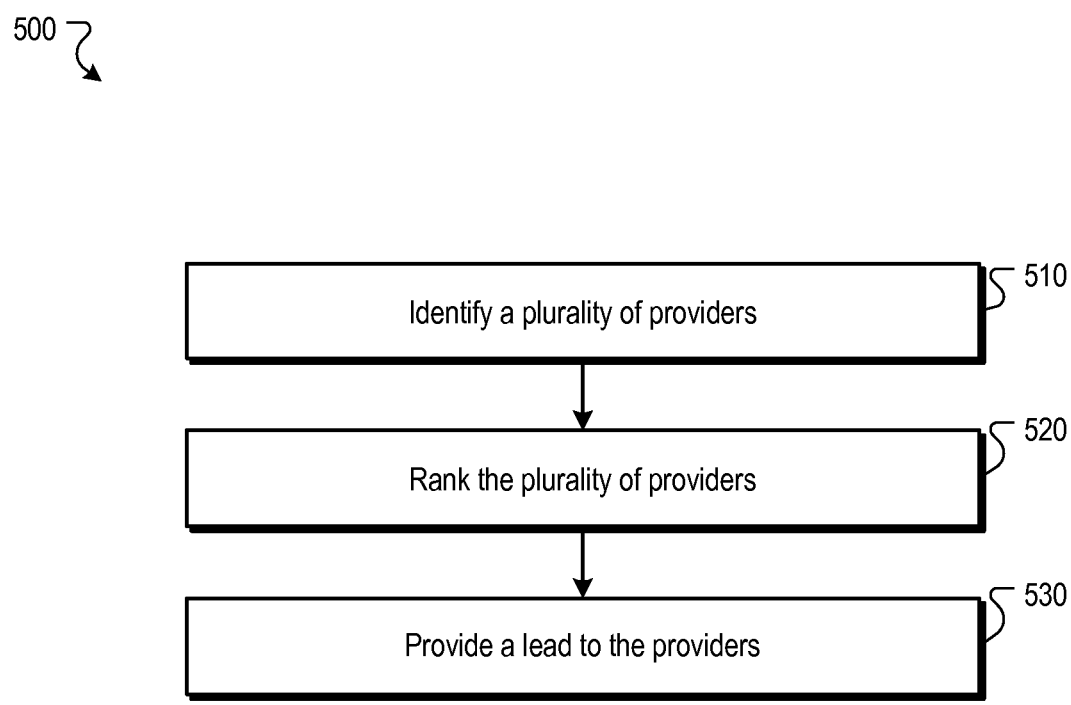
FIG. 5 is a flowchart of an example method for provider ranking

FIG. 5 is a flowchart of an example method 500 for provider ranking. At stage 510, a plurality of providers are identified. The plurality of providers can be identified, for example, by a provider selector (e.g., provider selector 320 of FIG. 3) using a request parser (e.g., request parser 410 of FIG. 4) in conjunction with a relevant provider identification component (e.g., relevant provider identification component 420 of FIG. 4). In some implementations, a relevance score can be derived based upon service information associated with the request and keywords associated with the providers. The relevance score can be derived based upon how well service information matches keywords associated with the provider.

At stage 520, the plurality of providers are ranked. The plurality of providers can be ranked, for example, by a provider selector (e.g., provider selector 320 of FIG. 3) using a ranking component (e.g., ranking component 430 of FIG. 4). In some implementations, the providers can be ranked based upon performance information (e.g., quality) associated with the providers. The performance information can include factors, such as, for example, response time, customer satisfaction ratings, or peer ratings, and combinations thereof. The performance information can be aggregated and normalized and then used to rank the providers. Such ranking can measure the performance of the provider against providers of the same or similar services or products.

At stage 530, a lead can be provided to providers. The lead can be provided to providers, for example, by a provider selector (e.g., provider selector 320 of FIG. 3) using a provider selection component (e.g., provider selection component 440 of FIG. 4) in conjunction with a communications interface (e.g., communications interface 310 of FIG. 3). In some implementations, the lead can be provided to providers based upon selection of the provider from a user after the providers are presented to the user in an order defined by the rankings derived at stage 420. In other implementations, the lead can be provided to a predefined number of providers in response to identification of the providers by the provider selector. In such implementations, submission of the service information to the provider ranking system can also include explicit permission to distribute the service information to relevant providers for the purpose of providing the requested product or service.

Figure 6:
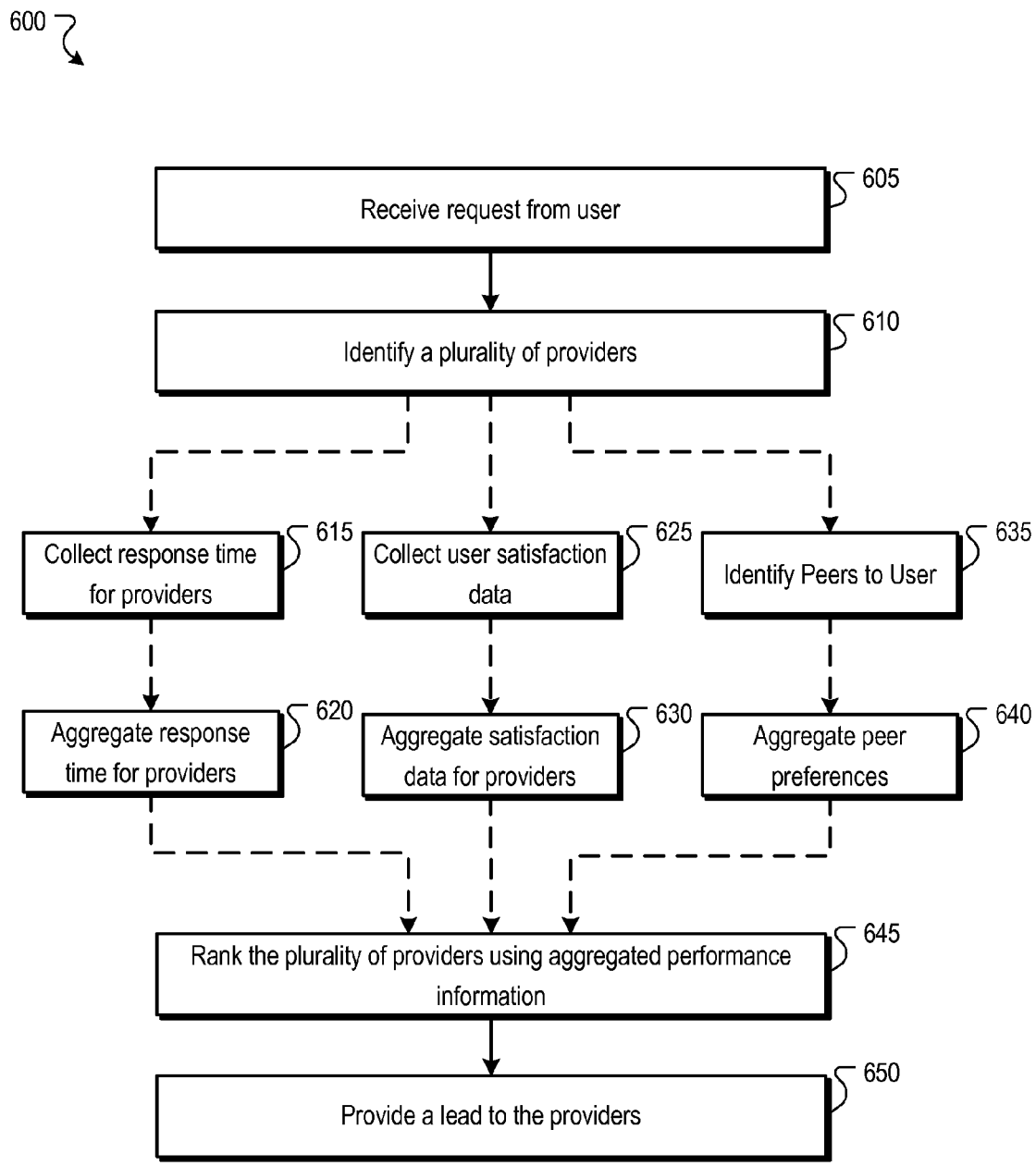
FIG. 6 is a flowchart of an example method for provider ranking with collection of performance information.

FIG. 6 is a flowchart of an example method 600 for provider ranking with collection of performance information. At stage 605, a request is received from a user. The request can be received, for example, by a communications interface (e.g., communications interface 310 of FIG. 3) of a provider ranking system (e.g., provider ranking system 110 of FIGS. 1-3). In some implementations, the request can include service information identifying the product or service being requested by the user. In additional implementations, the request can include profile information operable to be used in identifying a profile associated with the user. Such a profile can be used to identify a peer group for the user. In other implementations, the request can be derived from a query log (e.g., a historical request as opposed to a real time request).

At stage 610, a plurality of providers are identified. The plurality of providers can be identified, for example, by a provider selector (e.g., provider selector 320 of FIG. 3) using a request parser (e.g., request parser 410 of FIG. 4) in conjunction with a relevant provider identification component (e.g., relevant provider identification component 420 of FIG. 4). In some implementations, a relevance score can be derived based upon service information associated with the request and keywords associated with the providers. The relevance score can be derived based upon how well service information matches keywords associated with the provider.

In various implementations, stages 615-640 can occur in offline or can occur substantially in real-time with the receipt of the request. At stage 615, response time for providers is collected. The response time for providers can be collected, for example, by a provider ranking system (e.g., provider ranking system 110 of FIGS. 1-3) and stored in a provider performance data store (e.g., provider performance data store 340 of FIG. 3). In some implementations, the response times are previously collected and stored, and the stage 615 includes collecting the response time information from the provider performance data store.

At stage 620, collected response times can be aggregated. Collected response times can be aggregated, for example, by a provider selector (e.g., provider selector 320 of FIG. 3) in conjunction with a provider performance data store (e.g., provider performance data store 340 of FIG. 3). In some implementations, aggregation of the collected response times can be performed only for those providers identified as relevant. In some examples, aggregation of the collected response times can include averaging the collected response times. In other examples, aggregation of the collected response times can include computing a rolling average which includes, for example, the last 10 or 20 response times associated with the provider.

At stage 625, user satisfaction data is collected. User satisfaction data can be collected, for example, by a provider ranking system (e.g., provider ranking system 110 of FIGS. 1-3) in conjunction with a provider performance data store (e.g., provider performance data store 340 of FIG. 3). In some implementations, user satisfaction data can be collected using online or offline surveys of customers and/or prospective customers of the provider. Online surveys can be provided to the customers using the provider ranking system after the customer has completed a transaction with the provider (e.g., either through termination of communication with the provider or purchase of a product or service from the provider). Offline surveys can be provided through market/business analysis surveys provided by companies.

At stage 630, the collected user satisfaction data is aggregated. The collected user satisfaction data can be aggregated, for example, by a provider selector (e.g., provider selector 320 of FIG. 3) in conjunction with a provider performance information data store (e.g., provider performance information data store 340 of FIG. 3). In some implementations, the user satisfaction data can be aggregated by averaging the ratings received from customers or users who have interacted with the provider. In other implementations, a subset of user satisfaction ratings (e.g., ratings collected over a period, a previous number of ratings, a sampling of the ratings data, etc.) can be averaged. In still further implementations, the aggregation of ratings can be discounted based upon the size of the data set being below a threshold, thereby indicating that there might not be enough data to provide a statistically significant sampling of the user satisfactions ratings.

At stage 635, a peer group associated with the user is identified. The peer group associated with the user can be identified, for example, by a provider selector (e.g., provider selector 320 of FIG. 3). In some implementations, the peer group can be identified based upon network (peer network) with whom the user is associated. In other implementations, the peer group can be identified based upon profile information collected from the user, e.g., with the request. The profile information can be used to match the user to a peer group with whom the user shares interests and/or preferences.

At stage 640, peer group preferences are aggregated. Peer group preferences can be aggregated, for example, by a provider selector (e.g., provider selector 320 of FIG. 3). In some implementations, peer group preferences can include ratings of providers by users in the peer group. Such ratings can be collected, sampled, and averaged to identify peer group preferences. Aggregation of peer group ratings can be accomplished similarly to the aggregation of customer satisfaction ratings provided at stage 630.

At stage 645, the plurality of providers are ranked using the aggregated performance information. The plurality of providers can be ranked, for example, by a provider selector (e.g., provider selector 320 of FIG. 3) using a ranking component (e.g., ranking component 430 of FIG. 4). In some implementations, the providers can be ranked based upon aggregated performance information (e.g., quality) associated with the providers collected and aggregated at stages 615-640.

At stage 650, a lead can be provided to providers. The lead can be provided to providers, for example, by a provider selector (e.g., provider selector 320 of FIG. 3) using a provider selection component (e.g., provider selection component 440 of FIG. 4) in conjunction with a communications interface (e.g., communications interface 310 of FIG. 3). In some implementations, the lead can be provided to providers based upon selection of the provider from a user after the providers are presented to the user in an order defined by the rankings derived at stage 420. In other implementations, the lead can be provided to a predefined number of providers in response to identification of the providers by the provider selector. In such implementations, submission of the service information to the provider ranking system can also include explicit permission to distribute the service information to relevant providers for the purpose of providing the requested product or service.

Although the implementations described above have been focused on web-based collection of leads, in other implementations, the lead collection can occur using telephones, or collection of lead information through third party websites. In those implementations, collecting lead information using telephones, the receipt of contact information and service information can occur over the telephone. In some examples, an agent can receive the contact information and service information and enter it into the provider ranking system. In other examples, an integrated voice response system can be used to collect contact information and service information from a user. The captured speech responses can be transmitted directly to selected providers, or a speech to text conversion module can convert the speech into text for forwarding to the selected providers.

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method, comprising:
    identifying, by a computer, a plurality of providers based upon a request received from a user for an offering specified by the request;
    ranking, by the computer, the plurality of providers based upon a performance rating associated with each of the plurality of providers;
    selecting a subset of providers based on the ranking of the plurality of providers, the subset including at least two providers;
    providing, by the computer, a lead to each of the providers in the subset of providers;
    enabling communication from a first provider in the subset of providers that is first to respond to the lead to a user associated with the lead and precluding communication from the other providers in the subset of providers to the user that are not first to respond to the lead; and
    in response to determining that the user has rejected first provider, enabling communication from the other providers in the subset of providers to the user;
    wherein the communication that is enabled is a communication according to contact information provided for the lead for the responding provider to use to contact the user;
    wherein the performance rating comprises a social graph rating derived by identifying peers of the user and determining preferences associated with the user based upon the identified peers; and
    wherein identifying peers of the user comprises comparing a user profile of the user to user profiles of the peers.

2. The computer-implemented method of claim 1, further comprising receiving the request from the user through a search engine interface.

3. The computer-implemented method of claim 1, further comprising receiving the request from the user through a provider location interface.

4. The computer-implemented method of claim 1, wherein the performance rating further comprises at least one of a response time or a user satisfaction rating.

5. The computer-implemented method of claim 4, wherein each provider is associated with a response time and are ranked in order from quickest response time to slowest response time or a user satisfaction rating based upon feedback received from users.

6. The computer-implemented method of claim 1, wherein the peers of the user are further identified based list of users from a social network and determining preferences associated with the user based upon the identified peers.

7. The computer-implemented method of claim 1, further comprising:
    collecting response time information associated with the providers; and
    basing the performance rating for each of the providers upon the collected response time.

8. The computer-implemented method of claim 1, further comprising:
    collecting satisfaction ratings from the users for each of the providers; and
    aggregating the satisfaction ratings collected from the users;
    wherein the performance ratings assigned to the providers are further based upon the aggregated satisfaction ratings.

9. The computer-implemented method of claim 1, wherein the contact information provided to the providers is an anonymized contact information facilitating anonymous contact between the user and the provider.

10. The computer-implemented method of claim 1,
    wherein determining preferences associated with the user based on the identified peers comprises:
    aggregating preferences for the identified peers;
    assigning a rating to each of the providers based upon the aggregated preferences for the identified peers.

11. The computer-implemented method of claim 10, wherein the peers are identified based upon a peer network identified by the user.

12. The computer-implemented method of claim 10, wherein the peers are identified based upon identifying a similar profile between the identified peers and the user.

13. The computer-implemented method of claim 1, wherein identifying a plurality of providers based upon a request comprises:
    identifying a location associated with the user and a product or service associated with the request; and
    identifying providers within a service area associated with the identified location and matching the product or service associated with the request.

14. The computer-implemented method of claim 13, wherein the providers are further identified based upon bids associated with each of the providers.

15. The computer-implemented method of claim 1, further comprising deriving the request from a query log.

16. Software stored in one or more non-transitory computer readable storage device and comprising instructions executable by a processing system, upon such execution causing the processing system to perform operations comprising:

identifying a plurality of providers based upon a request received from a user for a product or service;

ranking the plurality of providers based upon performance rating associated with each of the plurality of providers;

for each request:

selecting a subset of providers based on the ranking of the plurality of providers, the subset including at least two providers;

providing, by the computer, a lead to each of the providers in the subset of providers;

enabling communication from a first provider in the subset of providers that is first to respond to the lead to a user associated with the lead and precluding communication from the other providers in the subset of providers to the user that are not first to respond to the lead;

in response to determining that the user has rejected first provider, enabling communication from the other providers in the subset of providers to the user;

wherein the communication that is enabled is a communication according to contact information provided for the lead for the responding provider to use to contact the user;

wherein the performance rating comprises a social graph rating derived by identifying peers of the user and determining preferences associated with the user based upon the identified peers; and wherein identifying peers of the user comprises comparing a user profile of the user to user profiles of the peers.

17. The software of claim 16, further operable to cause the processing system to perform an operation comprising receiving the request from the user through a search engine interface.

18. The software of claim 16, further operable to cause the processing system to perform an operation comprising receiving the request from the user through a provider location interface.

19. The software of claim 16, wherein the performance rating further comprises at least one of a response time or a user satisfaction rating.

20. The software of claim 16, further operable to cause the processing system to perform operations comprising:
collecting response time information associated with the providers; and
assigning a rating to each of the providers based upon the collected response time.

21. The software of claim 20, further operable to cause the processing system to perform operations comprising:
collecting satisfaction ratings from the users for each of the providers; and
aggregating the satisfaction ratings collected from the users;
wherein the ratings assigned to the providers are further based upon the aggregated satisfaction ratings.

22. The software of claim 16, wherein determining preferences associated with the user based on the identified peers comprises:
aggregating preferences for the identified peers;
assigning a rating to each of the providers based upon the aggregated preferences for the identified peers.

23. The software of claim 22, wherein the peers are identified based upon a peer network identified by the user using a social networking interface.

24. The software of claim 22, wherein the peers are identified based upon identifying a similar profile between the identified peers and the user.

25. The software of claim 16, wherein identifying a plurality of providers based upon a request comprises:
identifying a location associated with the user and a product or service associated with the request; and
identifying providers within a service area associated with the identified location and matching the product or service associated with the request.

26. The software of claim 25, wherein the providers are further identified based upon bids associated with each of the providers.

27. A computer-implemented method, comprising:
collecting, by the computer, performance information associated with providers;
ranking, by the computer, the providers based upon the collected performance information; and
for each lead of a plurality of leads:
selecting a subset of the providers based on the ranking of the providers, the subset including at least two providers;
providing, by the computer, a lead to each of the providers in the subset of providers;
enabling communication from a first provider in the subset of providers that is first to respond to the lead to a user associated with the lead and precluding communication from the other providers in the subset of providers to the user that are not first to respond to the lead; and
in response to determining that the user has rejected first provider, enabling communication from the other providers in the subset of providers to the user;
wherein the communication that is enabled is a communication according to contact information provided for the lead for the responding provider to use to contact the user;
wherein the performance rating comprises a social graph rating derived by identifying peers of the user and determining preferences associated with the user based upon the identified peers; and
wherein identifying peers of the user comprises determining a relationship between a user profile of the user to user profiles of the peers.

28. The computer-implemented method of claim 27, wherein the performance information further comprises an average response time associated with the providers.

29. The computer-implemented method of claim 27, wherein the performance information further comprises customer satisfaction ratings received from other users.

30. The computer-implemented method of claim 29, further comprising identifying peers to the users originating service or product requests, wherein the other users comprise identified peers to the users originating service or product requests.

31. A system comprising:
one or more computers and one or more storage devices storing instructions that are operable, when executed by the one or more computers, to cause the one or more computers to perform operations comprising:
identifying a plurality of providers based upon a request received from a user for an offering specified by the request;
ranking the plurality of providers based upon a performance rating associated with each of the plurality of providers;

selecting a subset of providers based on the ranking of the plurality of providers, the subset including at least two providers;

providing, by the computer, a lead for the request to each of the providers in the subset of providers;

enabling communication from a first provider in the subset of providers that is first to respond to the lead to a user associated with the lead and precluding communication from the other providers in the subset of providers to the user that are not first to respond to the lead; and in response to determining that the user has rejected first provider, enabling communication from the other providers in the subset of providers to the user;

wherein the communication that is enabled is a communication according to contact information provided for the lead for the responding provider to use to contact the user;

wherein the performance rating comprises a social graph rating derived by identifying peers of the user and determining preferences associated with the user based upon the identified peers; and wherein identifying peers of the user comprises comparing a user profile of the user to user profiles of the peers.

32. Software stored in one or more non-transitory computer readable storage device and comprising instructions executable by a processing system, upon such execution causing the processing system to perform operations comprising:

collecting performance information associated with providers;

ranking the providers based upon the collected performance information;

for each lead of a plurality of leads:

selecting a subset of the providers based on the ranking of the providers, the subset including at least two providers;

providing, by the computer, a lead to each of the providers in the subset of providers;

enabling communication from a first provider in the subset of providers that is first to respond to the lead to a user associated with the lead and precluding communication from the other providers in the subset of providers to the user that are not first to respond to the lead; and in response to determining that the user has rejected first provider, enabling communication from the other providers in the subset of providers to the user;

wherein the communication that is enabled is a communication according to contact information provided for the lead for the responding provider to use to contact the user;

wherein the performance rating comprises a social graph rating derived by identifying peers of the user and determining preferences associated with the user based upon the identified peers; and wherein identifying peers of the user comprises determining a relationship between a user profile of the user to user profiles of the peers.

33. A system comprising:

one or more computers and one or more storage devices storing instructions that are operable, when executed by the one or more computers, to cause the one or more computers to perform operations comprising:

collecting performance information associated with providers;

ranking the providers based upon the collected performance information;

for each lead of a plurality of leads:

selecting a subset of the providers based on the ranking of the providers, the subset including at least two providers;

providing, by the computer, a lead to each of the providers in the subset of providers;

enabling communication from a first provider in the subset of providers that is first to respond to the lead to a user associated with the lead and precluding communication from the other providers in the subset of providers to the user that are not first to respond to the lead; and in response to determining that the user has rejected first provider, enabling communication from the other providers in the subset of providers to the user;

wherein the communication that is enabled is a communication according to contact information provided for the lead for the responding provider to use to contact the user;

wherein the performance rating comprises a social graph rating derived by identifying peers of the user and determining preferences associated with the user based upon the identified peers; and wherein identifying peers of the user comprises determining a relationship between a user profile of the user to user profiles of the peers.

\* \* \* \* \*

UNITED STATES PATENT AND TRADEMARK OFFICE
CERTIFICATE OF CORRECTION

| | | |
|---|---|---|
| PATENT NO. | : 8,521,688 B1 | Page 1 of 1 |
| APPLICATION NO. | : 12/234380 | |
| DATED | : August 27, 2013 | |
| INVENTOR(S) | : Belwadi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 766 days.

Signed and Sealed this
Twenty-fourth Day of March, 2015

Michelle K. Lee
*Director of the United States Patent and Trademark Office*